US008296424B2

(12) United States Patent
Malloy et al.

(10) Patent No.: US 8,296,424 B2
(45) Date of Patent: Oct. 23, 2012

(54) NETWORK CAPACITY PLANNING

(75) Inventors: Patrick J. Malloy, Washington, DC (US); Dana Znamova, Rockville, MD (US); Alain J. Cohen, Washington, DC (US); Antoine Dunn, Silver Spring, MD (US); John W. Strohm, Rockville, MD (US); Abbas Haider Ali, Rockville, MD (US); Russell Mark Elsner, Bethesda, MD (US)

(73) Assignee: OPNET Technologies, Inc., Bethesda, MD (US)

( * ) Notice: Subject to any disclaimer, the term of this patent is extended or adjusted under 35 U.S.C. 154(b) by 245 days.

(21) Appl. No.: 12/861,832

(22) Filed: Aug. 24, 2010

(65) Prior Publication Data
US 2011/0055390 A1    Mar. 3, 2011

Related U.S. Application Data

(62) Division of application No. 11/507,112, filed on Aug. 19, 2006, now abandoned.

(60) Provisional application No. 60/709,761, filed on Aug. 19, 2005.

(51) Int. Cl.
G06F 15/16    (2006.01)
(52) U.S. Cl. ........................................ 709/224; 709/223
(58) Field of Classification Search .................. 709/223, 709/224
See application file for complete search history.

(56) References Cited

U.S. PATENT DOCUMENTS

| 6,650,731 | B1 * | 11/2003 | Steltner et al. ............. 379/15.01 |
| 2006/0190236 | A1 | 8/2006 | Malloy et al. |
| 2007/0041335 | A1 | 2/2007 | Zamova et al. |

OTHER PUBLICATIONS

Kuehn, P.J.; "Multiqueue Systems with Nonexhaustive Cyclic Service"; The Bell System Technical Journal, 58; Mar. 1979; pp. 671-698.
Hawa, M. and Petr, D.W.; "M/G/FQ:Stochastic Analysis of Fair Queuing Systems", IEEE $2^{nd}$ International Conference on Networking; Jun. 2002.
Bourke, P. "Trilinear Interpolation"; astronomy.swin.edu.au/-p.bourke/other/trilinear/; Jul. 1997.

* cited by examiner

*Primary Examiner* — Krista Zele
*Assistant Examiner* — Andrew Georgandellis
(74) *Attorney, Agent, or Firm* — Robert M. McDermott

(57) ABSTRACT

Data representing application deployment attributes, network topology, and network performance attributes based on a reduced set of element attributes is utilized to simulate application deployment. The data may be received from a user directly, a program that models a network topology or application behavior, and a wizard that implies the data based on an interview process. The simulation may be based on application deployment attributes including application traffic pattern, application message sizes, network topology, and network performance attributes. The element attributes may be determined from a lookup table of element operating characteristics that may contain element maximum and minimum boundary operating values utilized to interpolate other operating conditions. Application response time may be derived using an iterative analysis based on multiple instances of one or more applications wherein a predetermined number of iterations is used or until a substantially steady state of network performance is achieved.

38 Claims, 9 Drawing Sheets

NETWORK CAPACITY PLANNING

This application is a divisional of U.S. patent application Ser. No. 11/507,112 filed Aug. 19, 2006, now abandoned, which claims the benefit of U.S. Provisional Patent Application No. 60/709,761, filed Aug. 19, 2005.

BACKGROUND AND SUMMARY OF THE INVENTION

The present system relates to the field of network capacity planning and particularly relates to a simplified system for determining an affect of application deployment on a network.

A network is composed of a set of components, each with some associated behavior and properties. A simulation of such a network is a software program whose execution represents the network's components' properties and behavior.

These simulations are often utilized to determine either an existing or planned network capacity. For example, the simulations may be utilized as a tool to determine how to resolve capacity issues in existing networks or as a tool to determine whether a planned network will have sufficient capacity. The elements of the simulation may be extracted from an existing network topology and/or may be modeled from an intended topology. However, these network models often involve very complex network topology. As such, modeling network communications typically involves simulating a large number of elements, such as network components including nodes, routers, clients, etc., each with different properties and behavior. In addition, since each of the elements interact, the interaction affects system performance beyond what may be readily discerned merely by looking at individual performance characteristics.

Simulation of transmission characteristics of a network are further complicated in that network behavior does not scale linearly with network traffic. In other words, an increase in network traffic may be managed by a network that is working well within its operating capacity (e.g., less than 20% of capacity) without any appreciable increase in transmission delays. However, as the load increases, for example due to deployed application transactions, problems due to elements such as increased queuing delays, packet collision, buffer overflow, component delay, etc. impacts network performance in a way that is not directly scaleable based on behavior below these capacities. In addition, the transmission control protocol (TCP) may also impact the application since TCP controls how data is sent onto the network. Further, different applications may react differently to changes in the network, bringing even more complexity to the problem of determining how an application deployment will affect network and application performance. These problems are particularly exacerbated when network load increases over numerous portions of the network simultaneously such as when a network wide application deployment or upgrade is implemented. In addition, with an increase in remote access of network applications, network traffic of shared resources is further increased. In these cases, typical performance characteristics are of little use to predict actual network and application performance.

Tools exist that enable modeling of real or anticipated network transmission characteristics however, network simulations often are very complex and require a tremendous amount of computing resources not to mention man hours to properly model and implement.

It is an object of the present system to overcome disadvantages and/or make improvements in the prior art.

The present system includes a system, method and device for simulating application and network performance to facilitate application deployment studies and network capacity planning. In operation, data representing application deployment attributes, network topology, and network performance attributes based on a reduced set of element attributes is received. The data may be received from numerous sources and combinations of sources including a user directly entering the data, a program that models either of a network topology or application behavior, and a wizard that implies the data based on an interactive interview process. The present system simulates network performance based on the application deployment attributes (e.g., application traffic pattern, application message sizes, etc.), network topology, and network performance attributes. Application deployment attributes may be determined for example from an application trace, whether collected or created, and the simulation may be based on the application deployment attributes.

In one embodiment, the reduced set of element attributes may be determined from a lookup table of element operating characteristics. For example, the lookup table may contain element boundary (e.g., max and min) operating values. These boundary values may be utilized to interpolate other operating conditions. A graphical user interface (GUI) may be utilized for facilitating interaction including receiving the data and simulating the results within the GUI. The simulation results may be displayed as a graph of network response time or as a bar chart of network response time. The response times may be depicted as a function of delays attributable to simulation elements. The data may be altered and new simulation results may be provided based on the altered data. Both of a previous and new simulation results may be provided within a single GUI.

Application deployment attributes may be represented as transactions per hour (TPH). The application deployment attributes may include intervals having a constant configuration. Network performance may be simulated iteratively based on multiple instances of an application. The simulation may be performed until a predetermined number of iterations and/or until a substantially steady state of network performance is achieved.

The reduced set of element attributes may include a shortest path cost function attributed to each link of the network topology and the shortest path function may be modified link bandwidth, latency, and/or other network parameters. Each hop within the network topology may be modeled as a network cloud having simplified interaction attributes. The reduced set of element attributes may include modeling each router simply based on link buffer size; and modeling each link having an attribute related to at least one of latency, bandwidth, packet loss, and utilization.

The application deployment attributes may include a designation of a number of sites supporting network deployment. Each tier of application deployment may be presumed to be selected randomly such that each tier supplies application deployment equally or deployment sharing amongst tiers may be specifically designated. Application inter-arrivals may be treated as exponential distributions.

Delay on servers may be modeled by a utilization queuing model based on a number of simultaneous transactions on a server within a given time bucket. Congestion on a router may be modeled based on weighted fair queuing (WFQ) properties and the traffic flowing through the router. In one embodiment, a server may be modeled ignoring congestion effects on server delay. To expedite the simulation, an application response time may be received from a lookup table. Further, queuing delay may be calculated analytically.

BRIEF DESCRIPTION OF THE DRAWINGS

The invention is explained in further detail, and by way of example, with reference to the accompanying drawings wherein.

DETAILED DESCRIPTION

Figure 1:
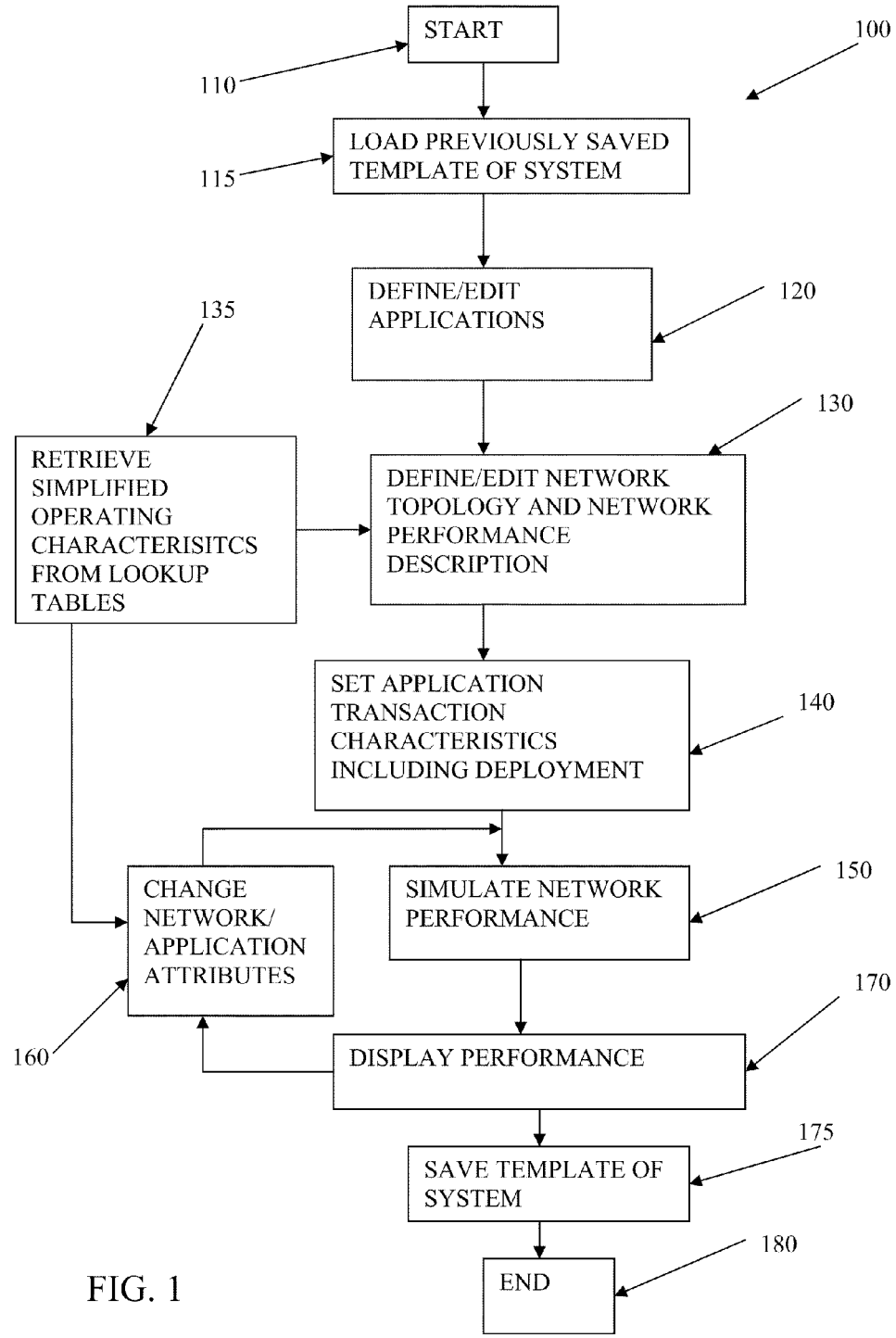
FIG. 1 shows a process flow diagram in accordance with an embodiment of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, modeling tools, analysis techniques and methods are omitted so as not to obscure the description of the present system.

It should be expressly understood that the drawings are included for illustrative purposes and do not represent the scope of the present system. In the accompanying drawings, like reference numbers in different drawings may designate similar elements. In addition, a first portion of a reference number designates a figure wherein the reference number is provided. The present system may depict different portions of a simulation including components being simulated, network topology, network propagation delays due to components and network bandwidth, etc., all of which may be modeled in various portions of the system in accordance with the present system. Accordingly, for purposes of simplifying a description, the terms "element" and "attribute" as utilized herein are intended to include all of the above and other related portions of a simulation that may be advantageously modeled unless explicitly or implicitly stated otherwise.

The system and method described herein address problems in prior art systems. In accordance with the present system, modeling tools and information are provided within a user interface (UI), such as a graphical user interface (GUI). The GUI may be provided by an application running on a computer. The visual environment is displayed by the computer on a display device and a user is typically provided with an input device to influence events or images depicted on the display. GUI's present visual images which describe various visual metaphors of an operating system, an application, etc. implemented on the computer.

The user typically moves a user-controlled object, such as a cursor or pointer, across a computer screen and onto other displayed objects or screen regions, and then inputs a command to execute a given selection or operation. Other applications or visual environments also may provide user-controlled objects such as a cursor for selection and manipulation of depicted objects in either of a two-dimensional or three-dimensional space.

The user interaction with and manipulation of the computer environment is achieved using any of a variety of types of human-computer interface devices that are connected to the computer controlling the displayed environment. A common interface device for GUI's is a mouse, trackball, keyboard, etc. A mouse is moved by a user in a planar workspace to move an object such as a cursor on the two-dimensional display screen in a direct mapping between the position of the user manipulation and the position of the cursor. This is typically known as position control, where the motion of the object directly correlates to motion of the user manipulation.

An example of such a GUI in accordance with an embodiment of the present system is a GUI for interaction within a network capacity planning tool to assist a user to determine network transmission capacity for a real or planned network topology. Through use of the user interface in accordance with the present system, for example provided within a graphical user interface (GUI), use and simulations provided by capacity planning tools is simplified in that simulated network components and topology is modeled to enable rapid network capacity planning and response time prediction based on application characterization, that is enabled by a simplified workflow that streamlines and speeds the user to the end result.

The present system provides a simple workflow that avoids configuration problems and simulation time of running full discrete event simulation experienced by prior systems. Further, the present system enables a modeling not only of network topology and operating characteristics but also of characteristics of real or anticipated network traffic, such as may be anticipated by deployment of remote access applications across a network. Further, in accordance with an embodiment of the present system, given a set of transactions with their transactions per hour (TPHs), network conditions (e.g., topology, link bandwidths, link utilizations, path loss, path latency, etc.), and TCP window size, the present system enables answers related to network performance such as what is a response time for the application and what is the load the application puts on the network, such as network throughput, link utilizations and other characteristics of the like.

FIG. 1 shows a process flow diagram 100 in accordance with an embodiment of the present system. At step 110, the present process is started. To successfully determine how deployment of a remote access program may affect network operation, the application or set of applications must be defined during act 120 to properly model a networks response to the deployment. The application may be defined by importing a packet capture file into an application characterization environment (ACE). After the user imports the packet capture file, extraneous traffic may be filtered out that is not of interest. ACE may then construct an application-level model of the application of interest.

The user may also model applications that are still in their design phase by importing applications as discussed in U.S. patent application Ser. No. 11/358,536, entitled "Application Level Interface to Network Analysis Tools", filed 21 Feb. 2006 for Malloy et al., which is incorporated herein by reference as if set out in entirety herein. Of course other systems may be readily utilized for modeling network traffic based on remotely accessed applications as may be readily appreciated by a person of ordinary skill in the art. In a case wherein the user wishes to study a set of applications, the process may be repeated for each application in the set. Advantageously, applications may be added or removed any time in the simulation process.

Another element of a successful simulation is construction of a network topology and performance description during act 130. The network may be defined in any number of ways. In one embodiment, a network may be implied by the set of applications used in this feature. In this embodiment, the network may be modeled as either a local area network (LAN) or remote network that is connected to the LAN via a cloud model. U.S. patent application Ser. No. 11/490,586, entitled "Automatic Estimation of Node Location based on Trace Information", filed Jul. 21, 2006, for Dana Znamova, Patrick J. Malloy and John W. Strohm, incorporated herein by reference thereto, discloses a system wherein an appropriate network model may be selected/created (implied) based on the trace information. In another embodiment, an existing network description may exist from other network configuration and topology collection tools or the network may be drawn from scratch. In accordance with an embodiment of the present system, network interaction is simplified based on simplified interaction models as will be described herein below.

Regardless of where the network is obtained from, the user may edit the network at any time. In accordance with the present system, a simple network model may be drawn or added to an existing model by simplifying assumptions about network configurations. For example, an assumption may be made that clients and servers are connected by a maximum number of hops, such as two hops. These hops may be modeled as network clouds having simplified interaction characteristics.

In accordance with an embodiment of the present system, a transaction's path within the network may be modeled. For example, a path cost function for each link may be set at one (1), however this may be modified to consider link bandwidth, latency and/or other network parameters. In this embodiment, since the link cost is one and a simple topology with a maximum of clouds, such as four (4) clouds is used, there will always be only one route from source to destination. However, as may be readily appreciated, more complex routing and/or a more complex topology may be utilized.

A GUI may provide an environment for creating a network description including a network model and/or for making changes to an existing topology. To facilitate manipulation (e.g., creation, editing, etc.) of the network model, the GUI may provide different views that are directed to different portions of the manipulation process. For example, the GUI may present a typical UI including a windowing environment and as such, may include menu items, pull-down menu items, etc. that are typical of those provided in a windowing environment, such as may be represented within a Windows™ Operating System graphical UI as provided by Microsoft Corporation. The objects and sections of the GUI may be navigated utilizing a user input device, such as a mouse, trackball and/or other suitable user input. Further, the user input may be utilized for making selections within the GUI such as by selection of menu items, radio buttons and other common interaction paradigms as understood by a person of ordinary skill in the art.

Figure 2:
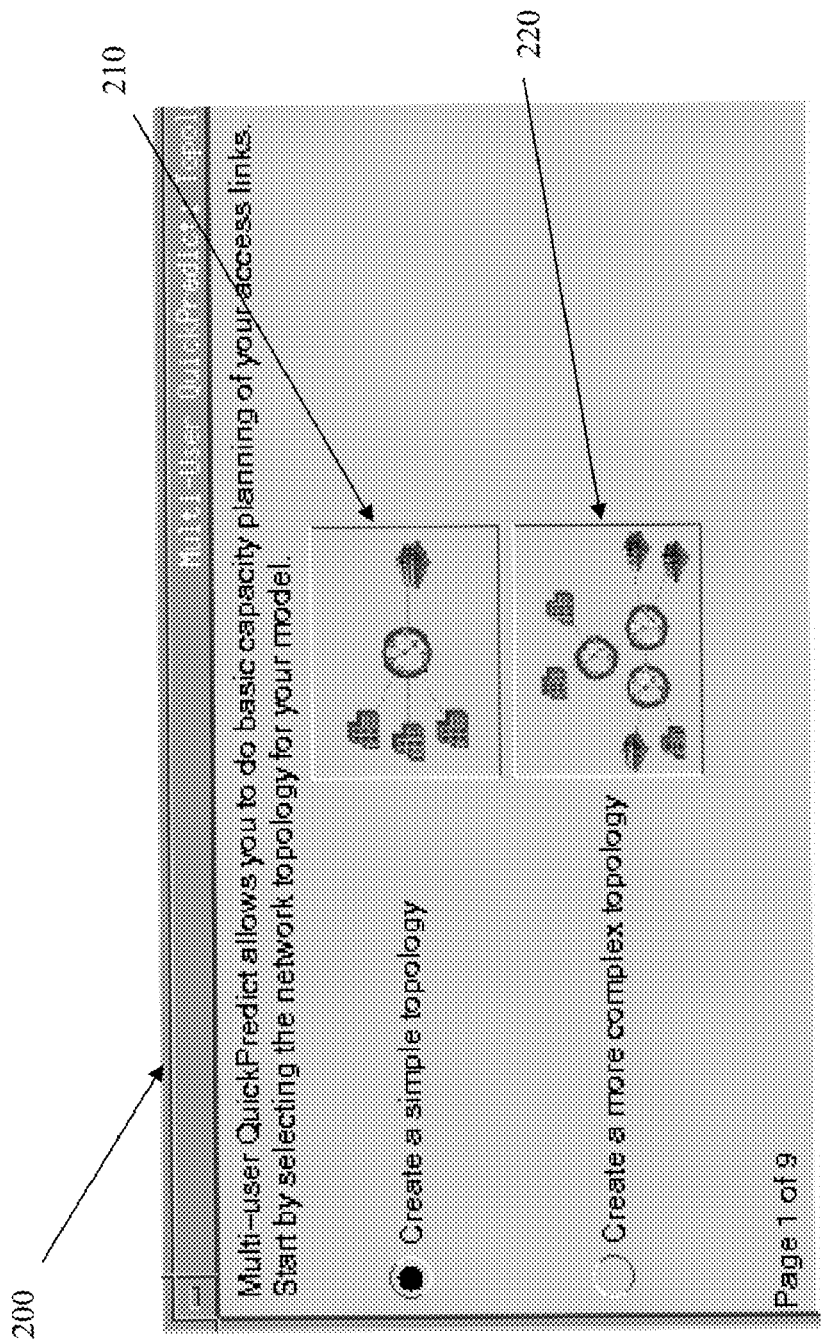
FIG. 2 shows a simplified GUI that may be utilized to create or edit a network model in accordance with an embodiment of the present system.

FIG. 2 shows a simplified GUI 200 that may be utilized to create or edit a network model in accordance with an embodiment of the present system. As such, the user is provided with an ability to select from pre-modeled typical network topologies with a selection item 210 or to create a more complex network topology through selection item 220. By an appropriate selection of menu items, the user then may describe a network configuration including configurable parameters that help simplify model simulation. For example, in choosing a network topology, the user may select whether the nodes will be connected by one or more hops. Selectable networks may include simple spoke and hub configurations or other more complex cloud configurations.

For example, if one cloud is selected, servers and clients are separated by a maximum one hop, otherwise there may be two or more hops in between. Once a topology is selected and/or created, link characteristics such as available bandwidth and baseline link utilization, for example attributable to other network traffic, may be defined. To simplify setting up a model, these link characteristics may be modeled as the utilizations seen on the link before transmission load, such as application load, is applied. Back-end tiers may be defined to identify last talker nodes. Transactions per hour (TPH) and intervals of transmissions, such as related to access to remote applications, may be defined. For example, TPHs may be defined by a total TPH field present within the GUI (see illustrative description below). In another embodiment, TPHs may be defined by a "Number of Users" and "Number of Transactions per User per Hour" fields. In the latter case, TPH per side is a product of the numbers provided in the two fields.

A transaction interval configuration may also be optionally specified. For example, intervals may be defined by a transaction's start and end time (e.g., transmission related to remote access of an application) which may overlap a further instance of a same transaction. In this way, the user may thus model a scenario where, for example, two transactions are running over one period of time and then 3 transactions running over the next period of time, etc. until a steady state is achieved. This process is simulated iteratively to get many combinations of application interactions. For example, consider a scenario where a given transaction is executed 100 times per hour and there is no other transaction on the network, assuming the application response time under network conditions with no other application running is fixed, such as 30 seconds. If the application inter-arrival time is constant, the application instances do not affect each other, and each of them would complete in 30 seconds. However, if the distribution of inter-arrival times is exponential (a common assumption for computer networks), there will be simultaneous application instances (an overlap of application instances). These application instances will then have different response times than if they were not run simultaneously.

The intervals of an application may be provided for in a selected configuration. These intervals may be determined from real-world deployment statistics or a user may set/alter the intervals. For example, the user may set TPH for the first 30 minutes as X. Thereafter, another application may be added having a corresponding TPH, or the same application may be added having a different TPH. In this way there may be many intervals where the configuration (e.g., TPH for applications) for that interval is constant yet the traffic is not constant.

Since there may be concurrent applications competing for resources, network characteristics, such as network throughput and response time due to an applications affect on another application may be determined. This cumulative effect of adding additional applications or additional instances of an application to a network is complicated since as a subsequently added application starts putting a load onto the network, a previous application is also affected as the two applications start competing for resources and consequently, the network conditions for both applications change, for example as a result of different queuing delays in the network.

In one embodiment, this relation may be simulated utilizing an iterative approach. Illustratively, an initial application response time may be assumed for applications A and B. Thereafter network conditions may be determined during an expected lifetime of B only when A is sending traffic over its last response time to calculate a response time of B. This response time may be stored and network conditions may be determined as before. This process may be repeated until a stable response time is reached. In this way, a simulation of simultaneous applications (whether multiple iterations of the same application or instances of a different application), may account for interactions with each other. For example, some applications may run simultaneously during their whole lifetime, while some may run simultaneously for just a period. In accordance with the present system, to consider these combinations, some number of application instances is simulated (e.g., 1,000 or more instances).

In this way, numerous application start times are generated. For example, running the transaction 1,000 times translates into generating 1,000 application start times (so that the applications inter-arrival times are an exponential distribution with given (configurable) mean. For example, assuming application A's inter-arrival times generated by a distribution are 2, 3, 4, 2. Then application A's start times are 2, 2+3, 2+3+4, 2+3+4+2=2, 5, 9, 11.

In accordance with an embodiment of the present system, if there are several transactions configured to run concurrently during a given simulation interval, the transactions start times may be generated independently for each application. Assuming each of the applications has at least 1,000 instances, this translates to 1,000 start times. For example, take 2 transactions, A and B. In one embodiment, 1,000 transactions of each application may be generated based on the applications' TPH. In examining when the last transaction instance starts, for example if A's last instance starts at 3000 sec and B's at 4000 sec, more instances of A may be generated so that the last instance of A starts after 4,000 and the instance of A before the last instance of A starts before 4,000. In this way, runs (1,000 or more) are generated on per first talker/transaction basis. For example, if there are two (2) transactions starting at different nodes, at least 1,000 transaction instances may be created for each of them.

In accordance with an embodiment of the present system, the following feedback approach may be utilized as a series of acts:

1. Create a constant bucket size (however constant may be changed), such as 10 second buckets on the links in the network. One set may be created for each link direction (A→B, B→A). The buckets store per-application/first talker bits seen on the link during the bucket interval.

2. Initialize all application response times to some value. For example, the application response time may be set to a constant value, such as 30 sec. In another embodiment, the application response time may be set based on the application response time under network conditions when there is no other traffic. In a further embodiment, the application response time may be set to twice, or other value of the like, the application response time when there is no other traffic.

3. Thereafter, for each transaction instance, initialize response time to the value from act 2. In addition, each transaction instance destination node may be set. For example, each application instance may be set to go only to one destination over a unique path. In another embodiment, an application may be configured such that it is destined to two or more nodes. However, for the simulation to converge, each transaction instance is simulated to go over the same path across all iterative simulation runs. Thus, once the start times are generated, the destinations and path are resolved and this information may be stored.

4. Run N times using response times obtained from lookup tables (described further herein below).
   i. For each transaction, for each instance (going in the direction of increasing start time) put traffic for all instances on the links using the previous run response time and total application traffic. This may be performed independently for each application direction, for example, assuming a constant traffic flow (e.g., throughput=application load/response time);
   ii. For each transaction, for each instance (going in the direction of increasing start time),
      a. Remove traffic for the transaction instance from the link (to avoid double-counting traffic),
      b. Get the network conditions (described further herein below). Using an average utilization for the expected application duration and a queuing delay that may be derived, latency and packet loss may be derived,
      c. Calculate response time using lookup tables given the obtained network conditions
      d. Put the traffic back on the link
      e. In one embodiment, to avoid oscillations, the new response time may be set to be ⅓ of the previous response time and ⅔ of the response time calculated in act "c" above
   iii. Remove all traffic from all links In one embodiment, Act 4 may be run (e.g., N times) a fixed number of times, such as ten (10) times. In another embodiment, the simulation may be run until the network is substantially stable (e.g., until network conditions do not change considerably between the runs and application response time does not change substantially for transaction instances for consecutive runs). For example, substantially stable conditions may be when conditions do not change more than 1 percent between runs. This percentage may be measured in a difference between the response times for subsequent simulations runs. However, clearly other thresholds for stability may be suitably applied.

5. The result of act 4 above, for example, may be a set of at least 1,000 response times for each transaction/first talker. These response times may be processed to determine an average and worst case for each transaction (then transaction/first talker and finally first talker). Acts 4/ii may be repeated for the average and worst case, however, utilizing a simplified simulation wherein mean values of one-way latency, packet loss, TCP window size, minimum link bandwidth for each direction, link utilization for each direction, minimum available link bandwidth such as the bandwidth on the link comprising a lowest available bandwidth, maximum TCP segment size (MSS) size, as well as other characteristics of the like, are utilized to obtain the response time and its delay components. In one embodiment, getting network conditions (as described below) may also return queuing delay, this information may be utilized to get a better distribution of delay components. In this embodiment, the simplified simulation may be run twice, the first time using latency as calculated above and a second time setting latency to "latency—queuing delay". The difference in response times may be attributed to congestion delay;

6. Get an average and percentile link utilization based on traffic seen in the link buckets after the last lookup table run.

7. These results may be presented to the user.

In another embodiment, convergence statistics may be utilized to decide how many times lookup table runs are performed (as described in step 4 above). Initial response time may be set based on expected network conditions. For example, if low load is assumed, initial response time may be set to the transaction response time under best possible network conditions given the topology and settings. However, if high load is assumed, the initial response time will be higher. In this way, the simulation will then converge faster.

Further, in a case wherein the network conditions change during the lifetime of a session, the simplified simulation may be run on a per-constant-network-condition interval basis.

In an alternative embodiment, the simulation may be run on a per-bucket basis wherein all application instances are sorted by their start times. This would change acts 4/i and 4/ii. The acts would be modified such that each transaction in the transaction list is sorted by transaction start time.

In another embodiment, smaller link buckets (e.g., less than 10 seconds) may be utilized to get more precise results. For example, with a larger bucket, the system may not be able to detect if the link is over-utilized for less time, such as 5 seconds, if it is not at the same time over-utilized for 10 seconds.

Network conditions, as mentioned above, may be calculated for different cases, such as when the network is over-utilized and when the network is not over-utilized. The network may be defined to be over-utilized if during an expected transaction instance, the sum of the load already on the links (e.g., calculated as average during the last response time for the application) and the load that the transaction is putting on the network (e.g., again calculated as average throughput=total transaction load/last response time) would result in utilization higher than 100% on any link in the network. If the link is over-utilized only for a short period, but not on average, the link may be considered as not over-utilized.

In reality, the network is never more than 100% utilized. However, during simulation execution using lookup tables, there may be instances of over-utilized links, even if the final result means that the network is not overloaded (e.g., taking into account all the traffic that loads the network). This is simply because the network is not stable and transient conditions are utilized.

Over-utilization during a simulation bucket interval is typically not propagated between lookup table runs as the applications that run over a utilized link react to these conditions, and the application's response time is recalculated so that the link is not over-utilized. However, there are legitimate cases when the link is still over-utilized. For example, a link may be over-utilized when it is impossible to decrease the application load (for example load for UDP traffic does not react to the network conditions), or traffic for a new application instance is seen on the link at the time when the processed instance runs (for example, the load is brought down to 100% for the applications that started after the processed application instance, but there is new traffic that showed up in the next run as a result of an increased application response time for an application that starts before the processed instance).

Similarly, a link that is under utilized in one run may be over-utilized in the next. Over utilization is typically a temporary issue that goes away after the applications react to it.

In one embodiment, network conditions are obtained for instances when the path is not over-utilized by getting the effective bandwidth, latency, packet loss and TCP window between each pair of sites. For example, from A to A, the bandwidth is always 100 Mbps, the latency is 0, the packet loss is 0, and the TCP window is a configured TCP window (not the calculated average TCP window calculated as in-flight data described later), such as 17 kBytes. The bandwidth/utilization is determined without the traffic for an application instance that is being processed. The minimum bandwidth is set as the minimum along the path per tier. The utilization is the max utilization on the path. The bandwidth and utilization may be selected so that the product of the minimum bandwidth and utilization is minimum on the path, although both must be related to the same link. In one embodiment, the utilization may be selected as the higher utilization in both directions (this utilization does not include the application traffic) although in another embodiment, differences in directional bandwidth (e.g., in attributes) may be utilized in both directions. For example, return and use utilization for each direction may be utilized in place of the maximum utilization. Additionally, directional bandwidth may be allowed, thereby enabling simulation of asymmetric links.

The loss probability is a probability that the traffic with the current application traffic on the link will be dropped. Packet loss consists of path loss (configurable) and the sum of losses on clouds due to finite buffer size. This may be calculated similarly to calculating a chance of at least one coin flip being heads. For a finite buffer loss, knowing the average work on the queue (link throughput), the probability that the work in the queue exceeds the buffer size of the queue may be calculated. That probability will give the packet loss. For example, a formula to calculate loss given buffer usage and capacity may be:

$$\text{probability} = (1-a)\frac{1-a^{packetcapacity}}{1-a^{packetcapacity+1}}$$

where, a=arrival_rate/service_rate=link throughput/link capacity. The above equation assumes that the buffer capacity in packets is known. However, when this is not the case, it needs to be further estimated/calculated. For example, first assume that packet capacity is at least 8 (if it's less, set it to 8). This corresponds to a current configuration on many routers because the routers are configured so that they hold at least 64 frames or their buffer size can store data sent out in 250 msec.

To calculate the number of packets in 250 msec, it is necessary to know the average packet size. This number is not configurable and needs to be estimated. Since the simplified simulation described above assumes a tail drop router behavior, the same assumption may be made here and the average packet size may be defined and then calculated as the average in-flight data rather than the packet size. The average in-flight data may be calculated using total response time, throughput and latency. A larger window for the two directions may be taken as a result. In one embodiment, if the window is less than a given value, such as 1500 Bytes, it may be set to 1500 Bytes.

In one embodiment, the simplified simulation may be utilized to return an average window and average packet size. Further, a directional packet size may be utilized to account for differences based on the direction of a transaction packet. In one embodiment, the loss calculation may be performed only if the link throughput (including the traffic for the currently processed application instance) is at least 50% since otherwise, the loss is typically negligible.

The latency may be taken as a sum of path latency (configured on a path), transmission delay, and queue delay latencies. Queue delay may be calculated with the current application instance on the link. Although in a real network, latencies may be asymmetric, for example, due to queuing on router interfaces. For queues, final latency may be taken as the sum of latencies in both directions divided by two. This may be acceptable since calculations may use round trip time (RTT), and not one-way transfer time.

From the link utilizations, calculate the added latency on each link using M/G/1 formula. Although the arriving traffic isn't exponential because of packet trains, each train may be considered to be a super-packet. The arrival of packet trains typically is exponential. The arbitrary service time of M/G/1 allows a variance to the service time to be assigned based on the distribution of packet train sizes. The delay may be calculated utilizing known formulas.

Since these equations "break" near 100% utilization and may result in higher than expected delays at around 100%, in one embodiment, the queuing delay may be limited to a minimum of 250 msec and the time needed to transmit 64 packets (this is the maximum time the packet can wait in a queue).

Network conditions for an over-utilized path may be determined separately. 100% link utilization is a highly non-linear case in terms of delay and packet loss. Analytical equations may no longer be used to predict queue delay as they do not work well near 100% utilizations as mentioned above. Accordingly, it is desirable that an alternative approach be utilized. One such approach in accordance with an embodiment of the present system may be to try to shape traffic using targeted available bandwidth. For example, if it is known that there are two applications on the link, it can be assumed that under stable network conditions each of them uses 50% of the link resources. This percentage can also be further recalculated using the throughput of individual applications so that the application sending more data gets a larger share of the bandwidth.

One drawback of this alternative approach is that it does not take into account the application type. For example, the effect of larger latency or an increased packet drop rate can be very different for bulk data traffic than it is for chatty applications. In accordance with the present system, it is desirable that an approach is utilized that combines the application knowledge (e.g., from the trace) with the network knowledge (from the modeled network). In accordance with an embodiment, the traffic is shaped by packet drops on over-utilized links. Applications that experience packet drops will decrease the load they send onto the network. Once it is detected that the offered throughput is higher than the link speed, the loss that is needed in order to bring the utilization down to 100% may be calculated. This loss may then used to calculate the application response time.

It may be assumed that application throughput decreases linearly with packet loss:

throughput=application throughput no loss−packet loss*constant

In the above equation, the constant determines the sensitivity of the application to the loss. For example, if there are multiple applications running at the same time, then (presuming c2a, c2b, c2d are negative):

Throughput for transaction instance A:

throughput$A$=$c1a+c2a$*loss

Throughput for transaction instance B throughput$B$=$c1b+c2b$*loss

Throughput for transaction instance D throughput$D$=$c1d+c2d$*loss

Note: The above transaction instances may/may not belong to the same transaction.

The total throughput for a case with 3 concurrent applications is then $$\begin{aligned}\text{total\_throughput} &= \text{throughput}A + \text{throughput}B + \text{throughput}D \\ &= c1a + c2a*\text{loss} + c1b + c2b* \\ &\quad \text{loss} + c1d + c2d*\text{loss} \\ &= c1a + c1b + c1d + (c2a + c2b + c2d)*\text{loss}.\end{aligned}$$

And the loss that is needed to bring the throughput down to max possible throughput (=link capacity) is:

total_loss=(max_throughput−($c1a+c1b+c1d$))/($c2a+c2b+c2d$).

This implies that if constants c1, ... c2 were known, the loss may be calculated. In one embodiment, these constants may be calculated based on their physical meaning:

C1s are throughputs under no loss and full bandwidth available to the applications, while c2s show how the related application reacts to the packet loss. C2s are in general a function of the application characteristics and patterns (chatty versus bulk, versus mixed) and network conditions.

As mentioned above, c2 is a rate of how the application throughput decreases based on packet drops (c2 shows for example that on average over the period where c1 is calculated, N % packet loss brings down the throughput by M bits). C2 may be obtained from the throughput for two different values of loss. Lookup tables as described herein may be utilized to calculate response time for a given transaction and network conditions using 2 different loss values to derive the curve that describes c2.

The calculation of the application response time during an over utilization period may be performed done as follows:

1. The period (which is expected transaction response time from the last run) may be divided into buckets (e.g., a constant 10 sec). Calculate loss rate needed to bring down utilization to 100% for each bucket on all links the application is expected to run.

2. The simulation may then be performed on a per-bucket basis. The simulation may be run for each bucket (using the loss described here and other network parameters described below) and it may be calculated how much data was transferred in the bucket for each bucket until the whole application data is simulated as sent.

3. The response time may then be taken as the difference between the time when the data was finally transferred in full and the transaction start time.

The reason for performing the simulation on a per-bucket basis as described in the above steps is that the throughput is very sensitive to the loss, and the calculation requires a finer bucket granularity.

In some cases (e.g., if only UDP protocol is used as a transport protocol), it may be impossible to decrease the offered load using the packet loss (as UDP does not decrease the offered throughput in the presence of packet loss). In that case, the utilization is used to shape the traffic. The total available bandwidth may be divided proportionally to the offered throughput of the applications.

In one embodiment, since the throughput may not decrease linearly with loss, but rather exponentially, to get the most precise results for the "slope", the slope may be calculated for a known region (for example, if it is known that the expected loss is 0.5-3%, get the slope for this region; if the expected loss is somewhere between 2 and 5%, calculate the slope for this region).

Latency may be calculated as the path latency similarly to as described for a non-over-utilized link with the exception that the latency of an over-utilized link is capped at a fixed time, such as at 250 msec. The bandwidth/utilization is the bandwidth of the minimum link on the path (not the available bandwidth, which may even be 0), as it is assumed that the traffic is shaped only by dropping packets. Utilization is taken as 0. Packet drops will assure the shaping. The TCP Window is taken as the TCP window on the path.

QoS may be modeled, such as FIFO queuing, priority queues, and low latency queues. For example, analytical models exist to determine the congestion and packet loss for priority queues.

Within the GUI, the user may be prompted to enter network and TCP path characteristics. For example, in one embodiment, latency and loss may be configurable on a per-link basis, per-path basis, etc. depending on what information it is easier for the user to determine. Oftentimes, based on monitoring an existing network, per-path statistics may already be known or may be readily discernable, such as by measuring latency loss using ping or other tools available. TCP characteristics (e.g., window size) are properties of end systems and are thus may also be configured per-path.

In accordance with an embodiment of the present system, the user is able to perform further operations to edit the network within a graphical domain. For example, the user is able to add/delete: a machine, such as a server and client; a router (e.g., modeled as a cloud); and a link as a go between, for example between machines and routers, machines and machines, and routers and routers. In addition, the user may be provided an ability to edit attributes of the network. To simplify modeling, a machine may be modeled having a single attribute, namely a processing speed multiplier. In accordance with an embodiment of the present system, the processing speed multiplier may be treated as a linear multiplier for application delays on the machine.

Router attributes may be predefined based on router type and router attributes may be further edited. To simplify modeling, routers may be treated as having a single attribute related to link buffer size. Buffer size affects packet loss since when packets arrive at a faster rate than the router may process, the packets are stored in a packet buffer. In a case wherein the buffer is filled, arriving packets are lost. Accordingly, a larger buffer size affects the model by reducing packet loss while increasing queuing delay. In accordance with an embodiment of the present system, it may be assumed that routers are fast enough to send steady-state data at a rate equal to all of the links connected to the router. Links may be treated as having a simplified set of attributes, such as latency, bandwidth, packet loss, and utilization. Queuing delay may be modeled using a first-in-first-out model or it may be modeled per Quality of Service (QoS) class as discussed further herein below.

In another portion of the model, it may be determined how the one or more applications are deployed within the network during act 140. In accordance with an embodiment of the present system, an application is viewed as existing between virtual tiers such as between "client" and "web server". The network consists of (modeled) locations such as "Virginia Satellite Office" and "New York NOC". In this act, the user may set up a mapping which maps virtual tiers in a set of applications to be deployed to the locations in the network. Each virtual tier is mapped to one or more locations. When deploying first-talker tiers for each application, the user may specify an application use frequency. This frequency, for example expressed as transactions per hour, will specify how much traffic this location sends. In accordance with an embodiment of the present system, when figuring out a next tier of communication, it may be assumed that the next tier will be selected randomly. For example, if there are two choices for a second tier, the first tier will talk to node A 50% of the time and node B 50% of the time. In other embodiments, next tiers distributions may be directly selected or modified. Further, deployment of tiers may vary with location. In addition to defining where the applications run, the user may define QoS classes for related traffic. For example, a weighted fair queuing algorithm may be used to determine how much delay to apply to traffic when traveling through a router, etc.

Network performance may be simulated during act 150 and examined from many standpoints during act 170, however, since network traffic tends to be bursty, it may be helpful to examine network traffic under different scenarios by changing network/application attributes during act 160 to help identify potential problems. In accordance with an embodiment of the present system, an average case scenario may be simulated where applications are assumed to be evenly spaced and occurring at exactly the expected number of transactions per hour. This scenario may be helpful to identify minimum QoS requirements. A worst case scenario may also be specified, for example wherein the user configures a worst case by specifying a number between 50 and 99.9 percent overlap.

In another embodiment as described above, application response times may be determined for at least 1,000 simulation instances. After the simulation is finished (e.g., after 10 iterative runs), there are at least 1,000 values for response time, with one final value for each application instance. Thereafter, an average and percentile value may be determined based on these values.

In accordance with an embodiment of the present system, by treating application inter-arrivals as exponential distributions, the present system may calculate an actual inter-arrival time for the worst case by looking at an Nth percentile of the combination of the different clients exponential distributions, where N is a number selectable by the user. Since application inter-arrivals are being treated as an exponential distribution, the distributions may be added to produce a new exponential distribution. The resultant distribution may then be integrated to determine, for example, transactions per second.

In another embodiment, to get a broad spectrum of application interactions (basically many combinations of concurrent applications), each application may be assumed to be run numerous times (e.g., 1,000 or more times) and a response time for each run may be determined. Each of these application runs in the simulation may see different network conditions and may thus have different response times. The result is a set of response times that can be further processed statistically in accordance with an embodiment of the present system.

In accordance with a further embodiment of the present system, network performance may be examined as a time-varying graph of network health. By viewing the time varying graph, the user may see the average case and the worst case for a given prediction run, as well as any case in between. Further, delay components may be separately provided such as how much of the delay may be attributed to low bandwidth, high latency, TCP protocol, congestion, tier processing, etc. Illustratively, time intervals may be examined as time buckets within a time varying graph. For example, the exponential distributions may be examined to determine how many transactions occur within every time bucket (e.g., a five minute bucket). The time bucket size may be configurable by the user to enable an altering in the granularity of the analysis provided. For example, the granularity may be increased by reducing the time bucket to help examine a particular portion of time wherein a problem (e.g., increase in latency) is observed to help identify a cause of the problem.

Users will also be allowed to adjust a random number seed related to traffic to randomly alter transaction intervals and consequently the load on the network, since a variation in transactions may greatly affect the time-varying graph.

To facilitate network analysis, different traffic routing options may be examined. Routing tables may be utilized to examine potential routing scenarios including shortest path routing, routing provided by discrete event simulation (DES) software or flow analysis tools, and/or real-world routing data.

In accordance with an embodiment of the present system, packet loss on routers may be modeled based on the performance of specific routers and an amount and burstiness of traffic modeled as passing through the router. In modeling router behavior, router buffer size may be correlated to packet loss using standard formula to, for example, determine a mean and variance of the queue size, thereby providing an indication of a number of dropped packets per second. In accordance with an embodiment of the present system, users may set a specific loss on a link, loss on a path, and/or a predictive algorithm may be utilized to determine the router loss rather than dropping a fixed percentage of packets. As described previously, buffer size affects packet loss since when packets arrive at a faster rate than the router may process, the packets are stored in a packet buffer. In a case wherein the buffer is filled, arriving packets are lost. Accordingly, a larger buffer size affects the model by reducing packet loss due to a limited buffer size, while increasing queuing delay.

Illustratively, delay on servers may be modeled by a simple utilization queuing model based on a number of simultaneous transactions on a server within a given bucket. In another embodiment, the server model may be set to a "contention already modeled" behavior where the delay a given application incurs on a server is a fixed number based on an imported application's characteristics.

Other systems for calculating server delay may also be utilized such as by estimating congestion on a router based on weighted fair queuing (WFQ) properties and the traffic flowing through the router, as discussed in "Multiqueue Systems with Nonexhaustive Cyclic Service," published in The Bell System Technical Journal, 58, pp. 671-698, March 1979, by P. J. Kuehn and "M/G/FQ: Stochastic Analysis of Fair Queuing Systems," published in IEEE 2nd International Conference on Networking, June 2002, by Mohammed Hawa and David W. Petr.

In yet another embodiment, the link and server queues may be actually simulated. In this embodiment, iterative runs of the simulation (prediction) engine may be conducted. For example, since packet loss on routers affects application throughput, yet the packet loss on routers is affected by how much traffic is flowing through the router, which in turn is determined by application throughput. Accordingly, rather than using a purely discrete simulation to solve this problem, a first-order approximation of throughput may be obtained and used to calculate packet loss. In this embodiment, the first-order approximation may be utilized to determine throughput based on new packet loss numbers. This approach may be iteratively applied until a stable situation is reached or until a predetermined limit on the number of iterations is reached, for example as described above with regard to the illustrative feedback approach.

When performing this iterative loop, a caching of response times may be employed. The response times may be cached into different throughput buckets so that the response time from a period of high utilization is not used to predict a response time during a period of low utilization. For example, the last response time may be cached.

After stability on application response time is reached or all iterative runs have been performed (e.g., see act 4 of the illustrative feedback approach), the application response times as well as the utilization of the various machines and links in the network will be known. Components of delay for each application may be acquired by performing a series of simulation tests to figure out what percent of delay is due to bandwidth delay. For example, all link bandwidths may be set to infinite to determine how quickly the application completes with no bandwidth limitations. The delta between a regular case as discussed above and the simulation tests may be assumed to be the delay due to bandwidth. In accordance with an embodiment of the present system, the delay component may be adjusted to accommodate delay due to congestion, termed queuing delay (e.g., see, act 5 of the illustrative feedback approach).

In accordance with an embodiment of the present system, simulation to obtain response times may be expedited through use of lookup tables as mentioned above. These lookup tables are created/retrieved during act 135 before running the simulation. The lookup tables may have response times given for low and high bandwidth, low and high latency, low and high packet loss and low and high TCP window for each tier pair.

Using these tables, response time for a given set of network conditions may be quickly interpolated, while still using information from the simplified simulation. For example linear interpolation may be used. Linear fitting (interpoloation) assumes that a function is linear in arguments (=if an argument value changes, the return value will change linearly). The best fitting may thus be obtained if this condition is true. Several arguments may be selected for linear fitting including one over bandwidth (instead of bandwidth), loss probability, latency, and TCP Window. Linear interpolation of a function in X dimensions is a well-established method. The method fits a function to a function that is linear in each argument, but has hyperbolic cross-terms. For example, in 3 dimensions the function has a form:

$$f(x,y,z)=a1*x+a2*y+a3*z+a4*x*y+a5*x*z+a6*y*z+a7*x*y*z+a8.$$

Generally speaking, there may be two methods to interpolate, a geometric one, and fitting to a function (in the above case, find coefficients a1-a8 and get a function value). In one embodiment, a1, . . . a8 may be found from boundary values stored in the lookup table, and then a function value may be interpolated for any given input.

The lookup table may be created once per each transaction. The interpolated value (region) may be selected independently for each transaction depending on the network conditions that transaction is likely to experience. For example, for each transaction, go over all intervals and get all possible combinations of paths that the transaction may take. Then find the min and max loss, latency, bandwidth and TCP window when there is no additional load on the network. Then the following recalculations may be performed, set bandwidth (bw) range to "min_bw/4" to min_bw. In this illustrative embodiment, the max_bw=min_bw and the min_bw=min_bw/4. The min latency may be set as the latency on the path. The max latency may be set to a given latency, such as a maximum allowable queue delay (e.g., at least 0.25 sec). If max latency is higher than max queue delay, make sure that max latency is at least twice as much as min latency. A minimum loss (min loss) may be set=loss. Set max loss to at least 5%, if min latency is greater than 5%, max loss may be set to at least twice min loss. In a case wherein it is assumed that the application always runs over the same path, the TCP window will have only one window value.

A Lookup table for a multi-tier application with N tier pairs is an array of N lookup tables plus a base time. An illustrative method for constructing these lookup tables may include:

For each tier pair get network conditions across all possible paths that the multi-tier application may run on;

Calculate boundary latency, bandwidth, utilization, loss and TCP window values as described above for one-tier-pair applications;

The n-th lookup table will contain response times for boundary values for the n-th tier pair; all other tier pairs having the best possible conditions (=infinite BW, 0 latency, 0 packet loss, very large TCP window);

Record ideal response time under ideal conditions (=infinite BW, 0 latency, 0 packet loss, very large TCP window) across all tier pairs; and Get response time for each tier pair, by using lookup table to get response times for network conditions between this tier pair.

The application response time is then the sum of response times across all tiers minus (N–1) times the ideal response time.

Using these tables, response time may be interpolated given a set of network conditions including average and worst case analysis, for example, the lookup tables may be utilized during act 160.

In an alternate embodiment, instead of loss as described above, a square root of loss may be utilized since response time depends more linearly on the square root of loss than on loss. In an alternate embodiment, more regions may be added. For example, for a fitting performed based on 16 values in 4 dimensions, more regions may be added. For example, for a 3-dimentional fitting, as described on the web at "astronomy.swin.edu.au/~pbourke/other/trilinear/" an article entitled "Trilinear Interpolation", by Paul Bourke, July 1997, incorporated herein by reference thereto, the present embodiment would have more than one cube. Fitting therefore may consist of finding the cube inside which the argument values lie, and then perform the fitting.

In one embodiment, multiple regions may be created before the simulation. In an alternate embodiment, the system may start off with one region and regions may be added as needed. For example, new regions may be added if conditions are outside the box (min and max values) or if a large variance from the simplified simulation results is expected. This embodiment may be useful especially for latency and loss changes which are more dynamic (e.g., depend on the network conditions).

In another embodiment, for a multi-tier application, one lookup table per tier pair may be created rather than per transaction. Further, boundary values may be determined per tier pair. Clearly other variations may be introduced and are intended within the scope of to present system.

Several alternative modes may be readily implemented for use in this prediction phase of the simulation. For example, all links may be assumed to have infinite bandwidth. The simulation may then be utilized to determine how much bandwidth the application consumes. This mode enables the user to estimate how much bandwidth network links should minimally have, for example based on an organization's desired network operating parameters and the above determination of how much bandwidth the application minimally consumes. For example, a simulation may determine that no link will have more than 20% utilization, even during a peak period.

The present system may provide a further mode to reach a target Service Level Agreement (SLA) by comparing a response time actually obtained to the supplied value. In this mode, users may be enabled to answer questions about network performance such as how many users may be supported with a given network, how much bandwidth is required to support N users, how much improvement in performance of servers is required to support N users, how many users may be supported while still meeting a given response time for different applications, and may QoS be used to ensure that a given application meets certain performance targets?

The above questions may be answered by performing iterative studies, such as by configuring x applications and determining whether the x applications may be supported, then configuring y applications and determining whether the y applications may be supported, etc.

Reporting of network performance may be provided in many forms (see act 170) including an average performance and worst case performance (e.g., =percentile value). In accordance with an embodiment of the present system, to simplify analysis of simulation results, the results may be broken down into categories that may be selectable through use of a GUI. For example, simulation results may be depicted based on applications, links, machines, etc. Illustratively, results may be further broken down to per transaction, first talker, links, etc.

In an embodiment wherein results are provided based on application deployed, one or more graphs may provide response time and a breakdown of delays for each location to which the application is deployed. The depicted components of delay may include client delay, server delay, router delay, bandwidth delay, latency delay, protocol delay and other characteristics of the like. Further, a histogram of response times may provide more data than a simple average response time.

In accordance with an embodiment of the present system, predictions on the impact of different network conditions on an application's response time may be made. A simple system to modify the characteristics of an application task may be provided wherein after an application is modified, the effects of the changes may be provided in several ways including a graph of results, bar-chart, etc. depicting differences in results from different simulations. In this way, a depiction of how varying network characteristics including varying bandwidths, latencies, and other network parameters will affect application performance may be provided. What-if scenarios may be created and analyzed by varying the characteristics of one or more network paths, application attributes and/or deployment (see act 160).

Figure 3:
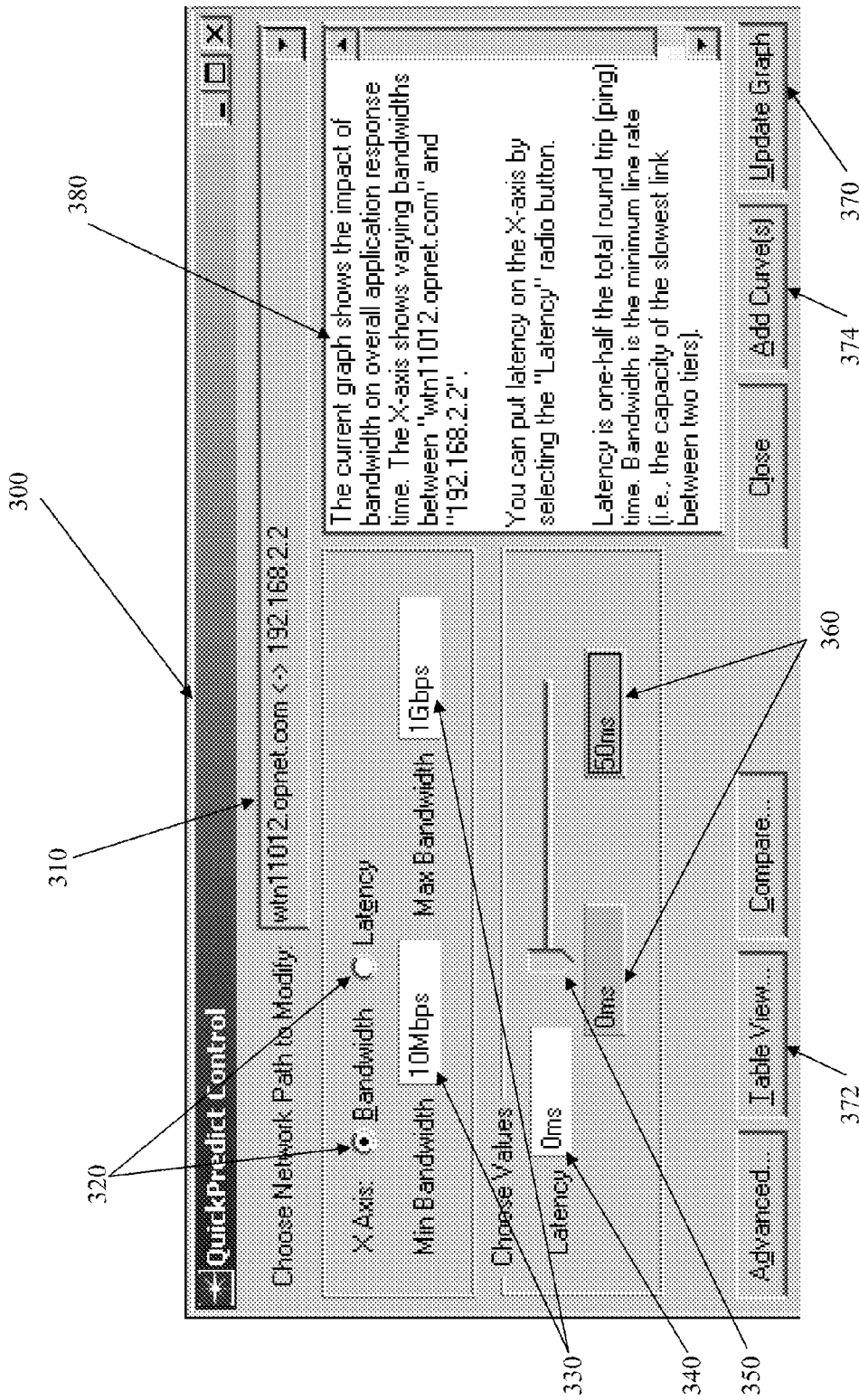
FIG. 3 shows a GUI in accordance with an embodiment of the present system for creating what-if scenarios.

FIG. 3 shows a GUI 300 in accordance with an embodiment of the present system for flexibly creating what-if scenarios, for example as a detailed configuration/test for a particular link or path. The GUI 300 provides an interface to facilitate a varying of parameters for a network path 310 that is selected. The GUI 300 is useful for studying the effect of bandwidth and latency variations over a single network path. The network path 310 selects the network path whose performance it is desired to study. A context sensitive text area 380 provides information on an operation available through the GUI 300. X-Axis radio buttons 320 may determine which of network parameter (e.g., bandwidth, latency, packet loss, link utilization, TCP window size, etc.) will form the x-axis in a resulting scenario. A range of x-axis parameters (e.g., min and max bandwidth) may be set or altered by selecting an edit field 330 for the x-axis parameter and thereafter setting or altering a value. A non x-axis parameter, such as the parameter not selected as the x-axis parameter, may thereafter be modified using an edit field 340 and/or a slider 350. A range of non x-axis parameters (e.g., min and max latency) may be set or altered by selecting an edit field 360 for the non x-axis parameter and thereafter setting or altering a value. Buttons are provided to enable a production of a simulation output. For example, buttons 370, 372 may be provided to enable production of respective graph and table views of simulation results to see how these variations affect, for example, an application response time (e.g., y-axis on the resulting graph).

Figure 4:
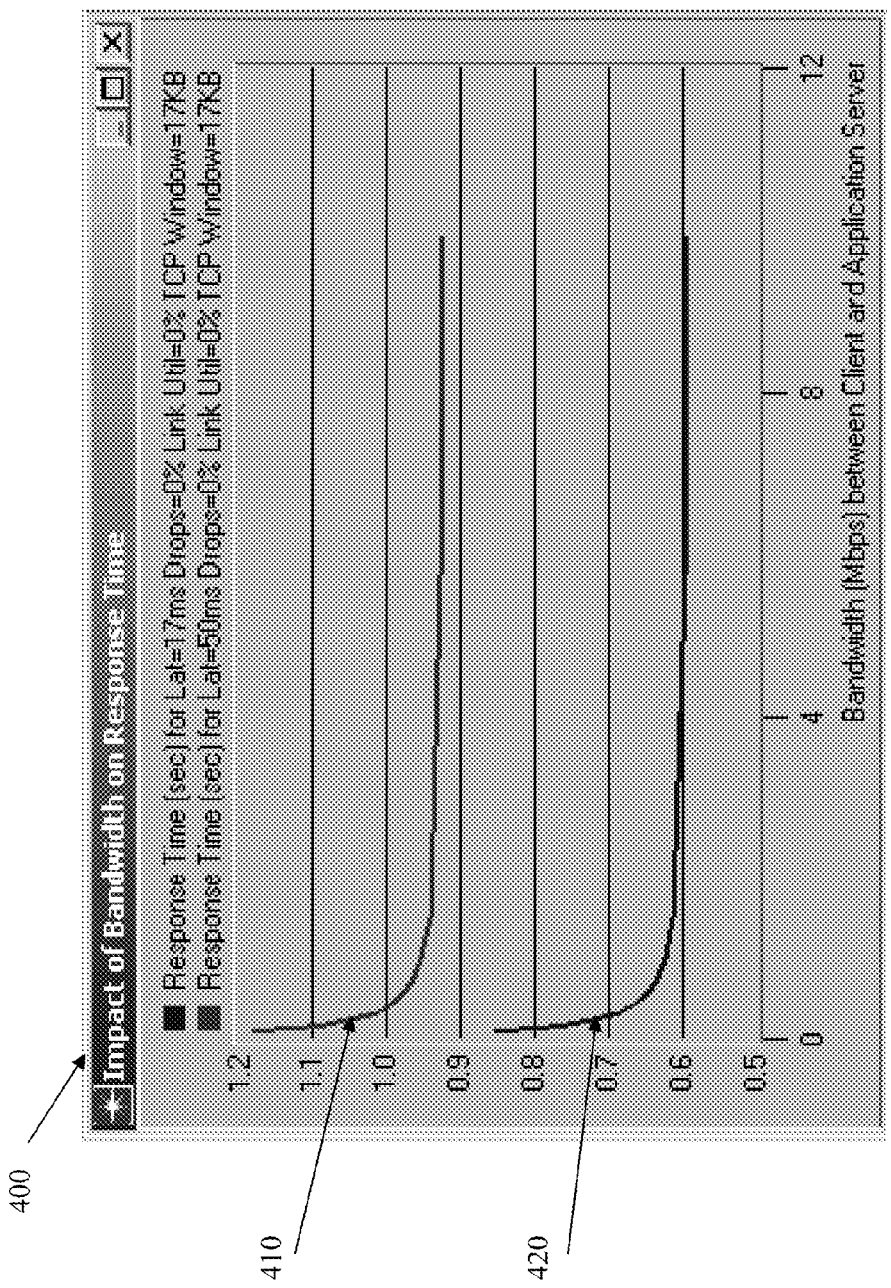
FIG. 4 shows a graph view that depicts results of how the network parameter specified will affect an application's response time (y-axis)

FIG. 4 shows a graph view 400 that depicts results of how the network parameter specified will affect an application's response time (y-axis). In one embodiment, changes to the non-x-axis parameter value made with the slider 350 may be reflected in the graph 400 immediately. Selection of the button 370 (e.g., left-clicking the button with a mouse and cursor combination as readily understood in the art) may update the graph 400 to view results of parameter changes as a graph 410. Selection of a button 374 may add another result 420 to the active graph by changing a parameter value before selection of the button 374. In this way, a direct comparison of the results of different parameter settings may be viewed in the same graph. In a case wherein a new x-axis parameter is specified, a separate graph may be utilized to depict the results. As may be readily appreciated, in a case wherein it is desired, results may be published in numerous forms as desired. For example, a right-click within the GUI 400 may bring up a context sensitive menu including an option to export the results to another system, such as a spreadsheet.

Figure 5:
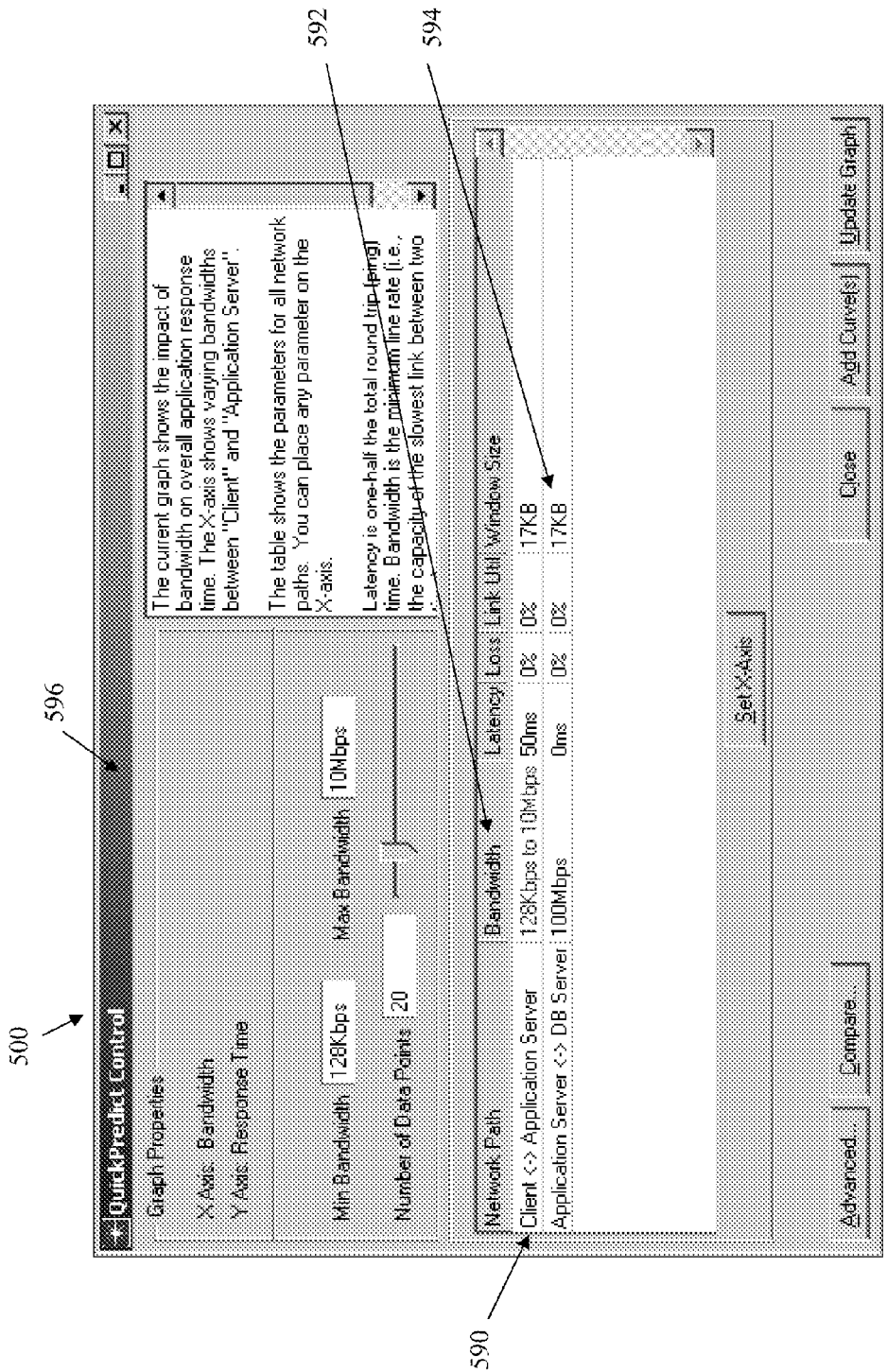
FIG. 5 shows a GUI having a tabular view in accordance with an embodiment of the present system.

Selection of the button 372 produces the results in a tabular view, such as shown in FIG. 5 and a GUI 500. The GUI 500 is similar to GUI 300 with the exception that a tabular portion 590 is provided. Similar to GUI 300, GUI 500 also enables the user to modify all available parameters on all network paths in the task. Similarly, the GUI 500 enables updates performance results depicted in the GUI 400. An indication 592 such as a change in color, font, highlighting, icon, and others of the like may be utilized to identify a current x-parameter, such as bandwidth. A left-click within a parameter cell, such as a parameter cell 594 may enable a change to the parameter setting.

As may be readily appreciated, while several of the options discussed above are presented as selection items within the various GUIs, the options may also be provided in a form of selectable menu items such as may be provided by a menu bar, or as a pop-up menu, sub-menu, etc., as understood in the art, for example in response to a right-click within a title bar 596. For example, a right-click within the title bar 596 may provide a menu selection item to produce a bar chart GUI, such as a GUI 600 shown in FIG. 6.

The GUI 600 provides an interface wherein similar as the GUIs 300, 500, network parameters may be altered. As such, the GUI 600 has a tabular portion 690 which has similar operation as discussed above regarding the tabular portion 590. Illustratively, the tabular portion 690 provides a system for depicting and changing system parameters beyond those illustratively shown in the GUIs 300, 500. The GUI 600 also provides bar charts 605 indicating a scenarios performance as described further herein. In accordance with an embodiment of the present system, in addition to depicting a result of one or more parameter changes on application response time within a scenario, the GUI 600 breaks down the total application response time into separate components of application processing time and network delay (e.g., propagation, transmission and protocol, and congestion delay) within the bar charts 605. The components are indicated through items such as items 616 indicating delay due to protocol and congestion delay. A key indicator 618, such as a color indication, is provided to assist in identifying which portion is attributable to this component. Additionally, within the GUI 600, the user may save (see FIG. 1, act 175 and end act 180) and/or load (see FIG. 1, act 115) templates of network settings including application attributes by selection of respective buttons 612, 614. Advantageously, this makes it easy to reuse network conditions and compare results with new condition settings.

An add a new scenario button 624 adds a new set of network parameters for the same application as previously provided in the bar charts. A selection item 626 provides an ability to label categories within the bar charts larger than X percent use. The selection item 626 provides an option to label components that account for a settable percent or more of the total delay time. In other words, it enables negating depiction of components that contribute to less than a designated percentage of the total delay time. A selection item 628 enables depicting an SLA, if an SLA (e.g., in seconds) is specified. In one embodiment, the SLA threshold may appear as a vertical line in the bar graphs. This makes it easy to see if the application violates an SLA in a specific scenario.

Illustratively, a parameter slider 650 may be provided to show how changes in a single parameter value affect the total application response time as well as the relative amounts of network vs. application delay. In this embodiment, to put a parameter on the slider 650 to enable altering of the parameter by the slider 650, a left-click in a parameter cell, such as a parameter cell 694 provides a selection of a "Put on slider" option from a pull-down menu. To specify a range for the slider 650, the user may enter minimum and maximum values in the fields 660 below the slider. The parameter value may also be set using a Value field 632 illustratively shown positioned above the slider 650.

Figure 7:
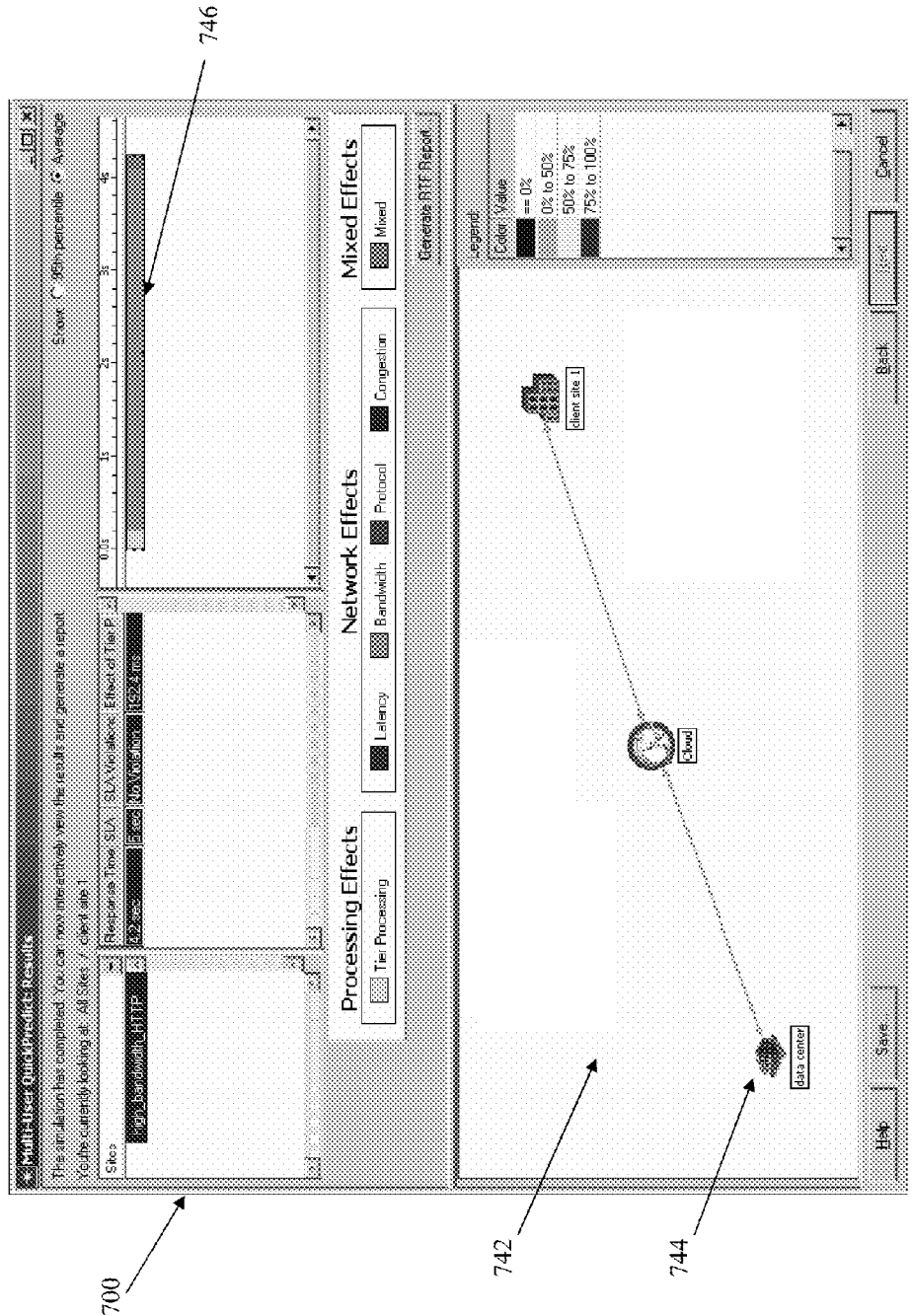
FIG. 7 shows a GUI that represents results of a simulation and that may be utilized to facilitate creation of a network to simulate deployments that may involve multiple clients, multiple servers, and/or multiple applications.

FIG. 7 shows a GUI 700 that represents results of a simulation and that may be utilized to facilitate creation of a network to simulate deployments that may involve multiple clients, multiple servers, and/or multiple applications. The GUI 700 may be useful when it is desired to perform capacity planning and application-response-time studies on access links. In one embodiment in accordance with the present system, selection of a menu item or selection of menu items 210, 220, for example as shown in FIG. 2, may enable production of a network formation wizard, as the term wizard is understood in the art, to guide a user through a simulated deployment. The wizard may be provided to prompt the user for information including deployed applications, network topology (e.g., number of client sites, clouds, data centers, etc.), tier-pair parameters (e.g., bandwidth, latency, link utilization, window size, and packet loss, see act 130 of FIG. 1), and application deployment options (e.g., number of transactions per hour for each client site, see acts 120, 140 of FIG. 1). Given these parameters, the present system may illustratively compute network operating conditions including average-case response times for applications, worst-case results for access links (e.g., utilization) and applications (e.g., total response time and components of tier processing, latency, protocol/congestion delay) during act 150 of FIG. 1.

By specifying the information prompted by the wizard, for example in context related windows, the wizard enables creation of a simple hub-and-spoke topology (e.g., see selection item 210 for creation of one central cloud network) or a more complex topology (e.g., see selection item 220 for creation of multiple regional clouds). In accordance with an embodiment of the present system, any number of applications may be defined and applied to the created network topology during act 120 of FIG. 1. For each application, parameters such as simple SLA (e.g., response time must always be less than x seconds) may be created and/or modified. For a complex topology, the present system may enable specification of a core network with multiple clouds including one to four clouds. For each link, the present system may enable the user to specify parameters including bandwidth and link utilization.

In accordance with an embodiment of the present system, all nodes may initially be connected through a first cloud. Thereafter, nodes may be connected to different clouds by specifying elements including client sites, data centers, and access links. After a number of elements such as client sites and data centers (e.g., depending on the network topology); and network characteristics such as the bandwidth and background utilization may be specified on each access link. For a complex topology including multiple clouds in, a link table may also include an "Attached to Cloud" entry column to connect access links to different clouds.

In accordance with an embodiment of the present system, back-end tiers in the applications may be mapped to data centers in the topology. For each transaction site, a transaction frequency may be specified for example as transactions per hour (TPH) for each transaction at each site (e.g., see act 140 of FIG. 1). For each element pair of a transaction, path characteristics including latency, packet loss, and TCP window size may be specified. For a network topology that has multiple data centers, the data center(s) on which each application is deployed may be specified.

In accordance with an embodiment, the user may choose to collect Nth-percentile results for link utilizations and response times. For example, if N is set to 90 by the user and/or by default, for example, the Nth-percentile result may be determined and presented to the user to depict all data points calculated for that statistic. For example, a GUI in accordance with the present system may depict 90% being lower than a reported value and 10% being higher.

FIG. 7 shows a view of GUI 700 that may be provided as current simulation results of a network topology and application deployment after entrance of parameters through the wizard described above. In accordance with one embodiment of the present system, links in the network depicted within the GUI 700, such as link 742, may be depicted with display characteristics to indicate performance characteristics. For example, a link may be overlaid with a color that shows simulation results including percentage utilization for that link. Selection of a link may enable a depiction of which applications flowed over that link within the simulation. Further, total link bandwidth attributable to each application may be depicted. In a further embodiment, a time slider 746 may be dragged to see utilization for each of individual traffic intervals (not done, but will be at some point) and utilization for applications sending data in the interval. In accordance with an embodiment of the present system, a selection of an element, such as a data center 744, may enable a depiction of details of the element and/or enable adding/editing of/to the element. A selection of a depicted machine in the network may enable depiction of a graph of machine utilization (e.g., see GUI 400) that may include an indication of which applications consumed which amount of the machine's resources.

Figure 6:
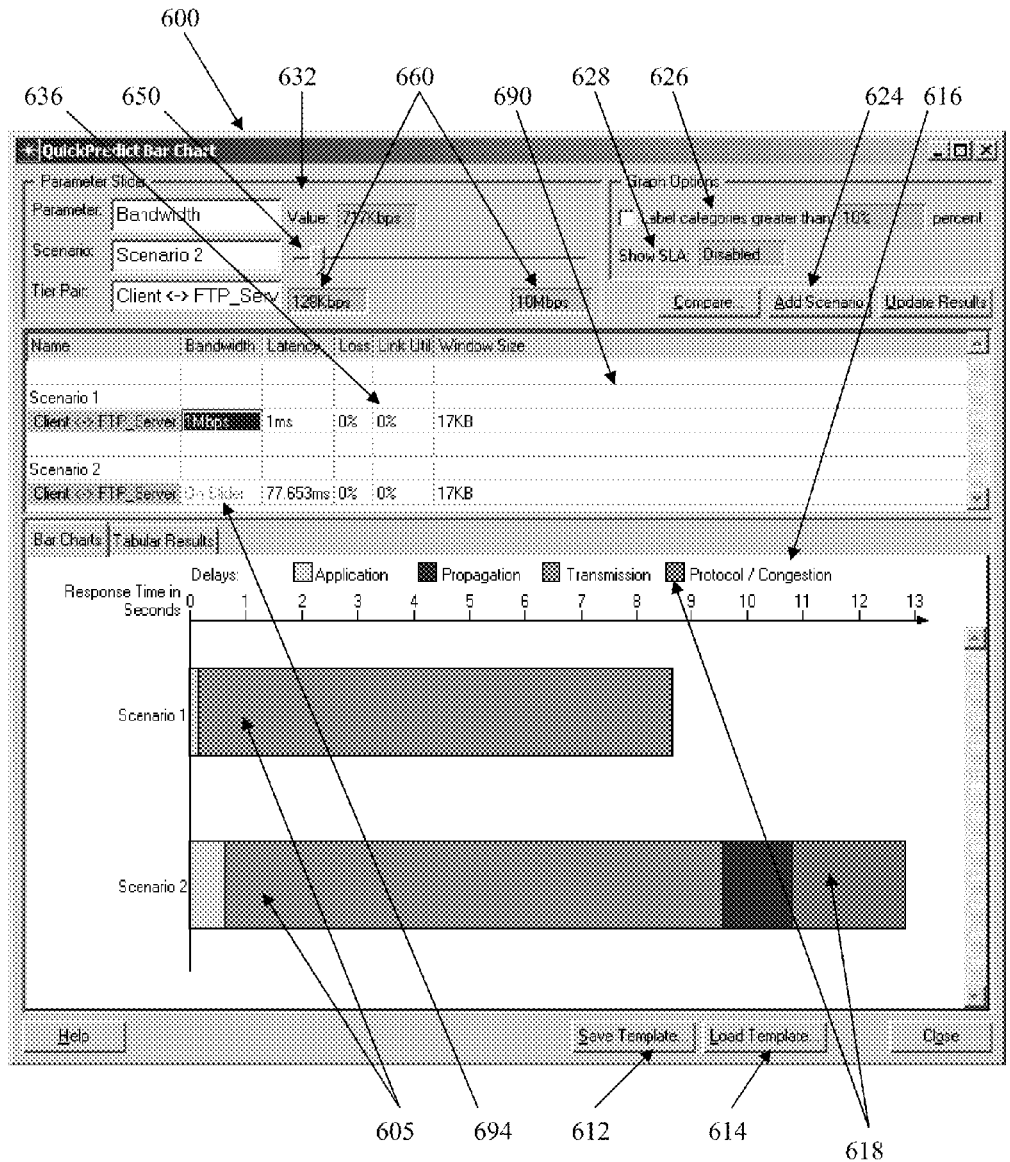
FIG. 6 shows a GUI having a bar chart view in accordance with an embodiment of the present system.

Advantageously, the present system may provide an insight into a general health of a site within the network in an integrated display, such as within the GUI 600 of FIG. 6. For example, in a network configuration utilizing a hub-and-spoke architecture, health of a site may be depicted as the bar charts 605 representing application response times for that site (e.g., whether a SLA is met) and utilization of link(s) 636 that leave that site. By combining these metrics, a more end-to-end picture of network health may be provided than by looking at either metric individually.

In accordance with an embodiment of the present system, a network-centric high level report may be provided depicting network operation characteristics such as which routers and which links are most overloaded. For example, router load may be depicted within the GUI based on a number of packets switched per second and/or on a number of packets dropped per second.

In one embodiment, network configurations may be saved and restored including applications, the network, and deployments (see FIG. 1). In a further embodiment, typical network deployments may be saved as a model to utilize in building future deployments. In this embodiment, a modification of characteristics of particular elements of the simulation may be provided to enable adaptation to a particular intended configuration without requiring the effort required to model a given network from scratch.

In accordance with a further embodiment of the present system, application attributes may be defined and/or altered to simulate an effect of application attributes. By using the application editing features in accordance with the present system, the effects of specific changes in an application may be readily determined. In one embodiment, results for both the original and the edited application may be depicted, such as within a graph as shown in GUI 400 and/or within a bar graph as shown in GUI 600.

Figure 8:
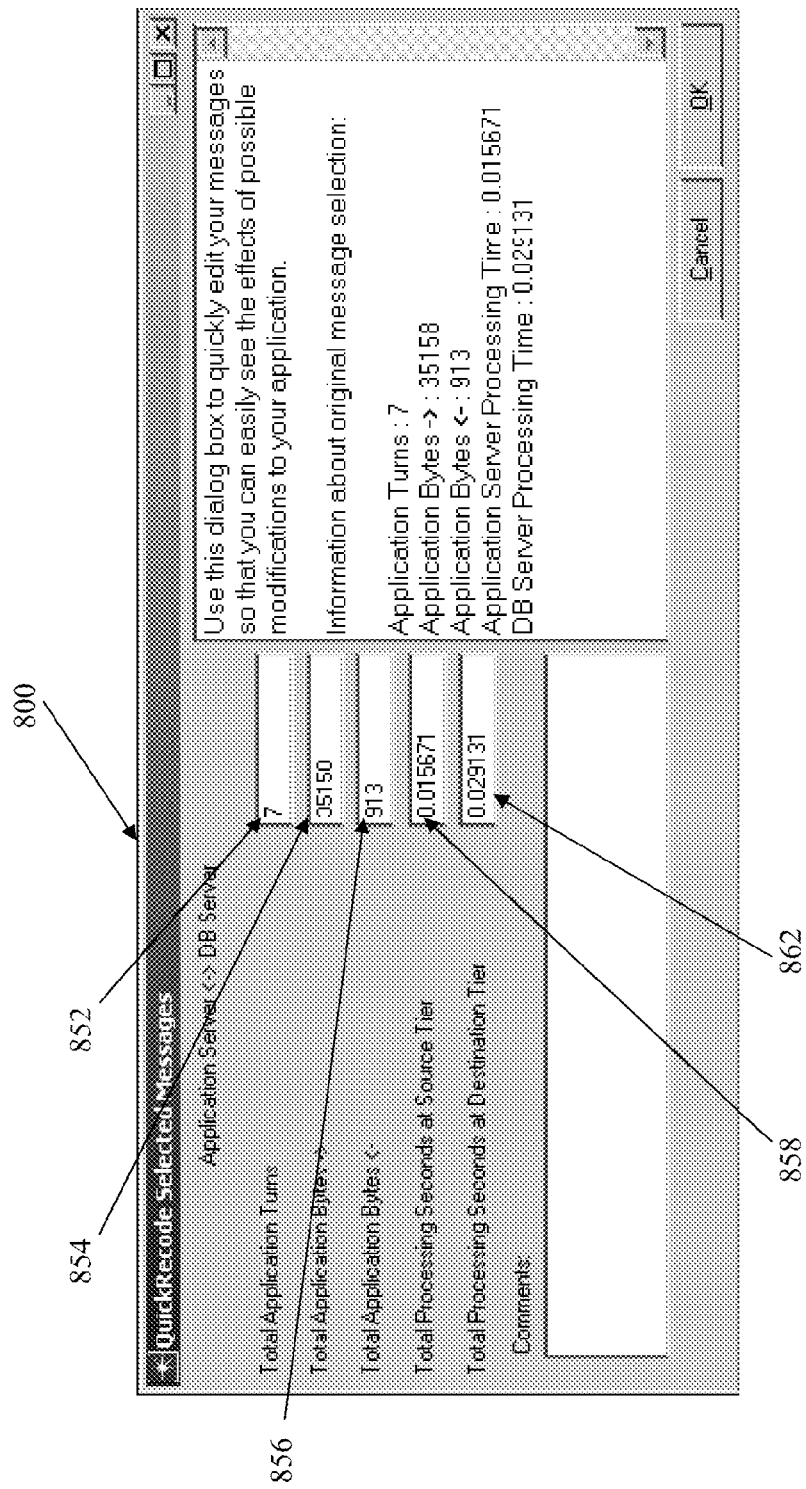
FIG. 8 shows a GUI 800 that may facilitate manipulation of application attributes in accordance with an embodiment of the present system.

FIG. 8 shows a GUI 800 that may facilitate manipulation of application attributes in accordance with an embodiment of the present system. As discussed above, typically application behavior is imported from an application modeling system or derived from real world use through use, for example, of a packet sniffer, packet capture device, etc. In other embodiments, application deployment behavior may be separately modeled or directly entered, for example through use of the present system. To modify the behavior of a real-world application or enter the behavior directly (e.g., number of turns 852, amount of application data on an outbound path 854 and an inbound path 856, and processing delay associated with each tier 858, 862), the present system may be employed illustratively facilitated through use of the GUI 800. For example, to determine an effect on a change in application performance the user may specify a "double-payload" level by doubling the amount of application data transmitted by each tier and then re-running the simulation as described above.

Figure 9:
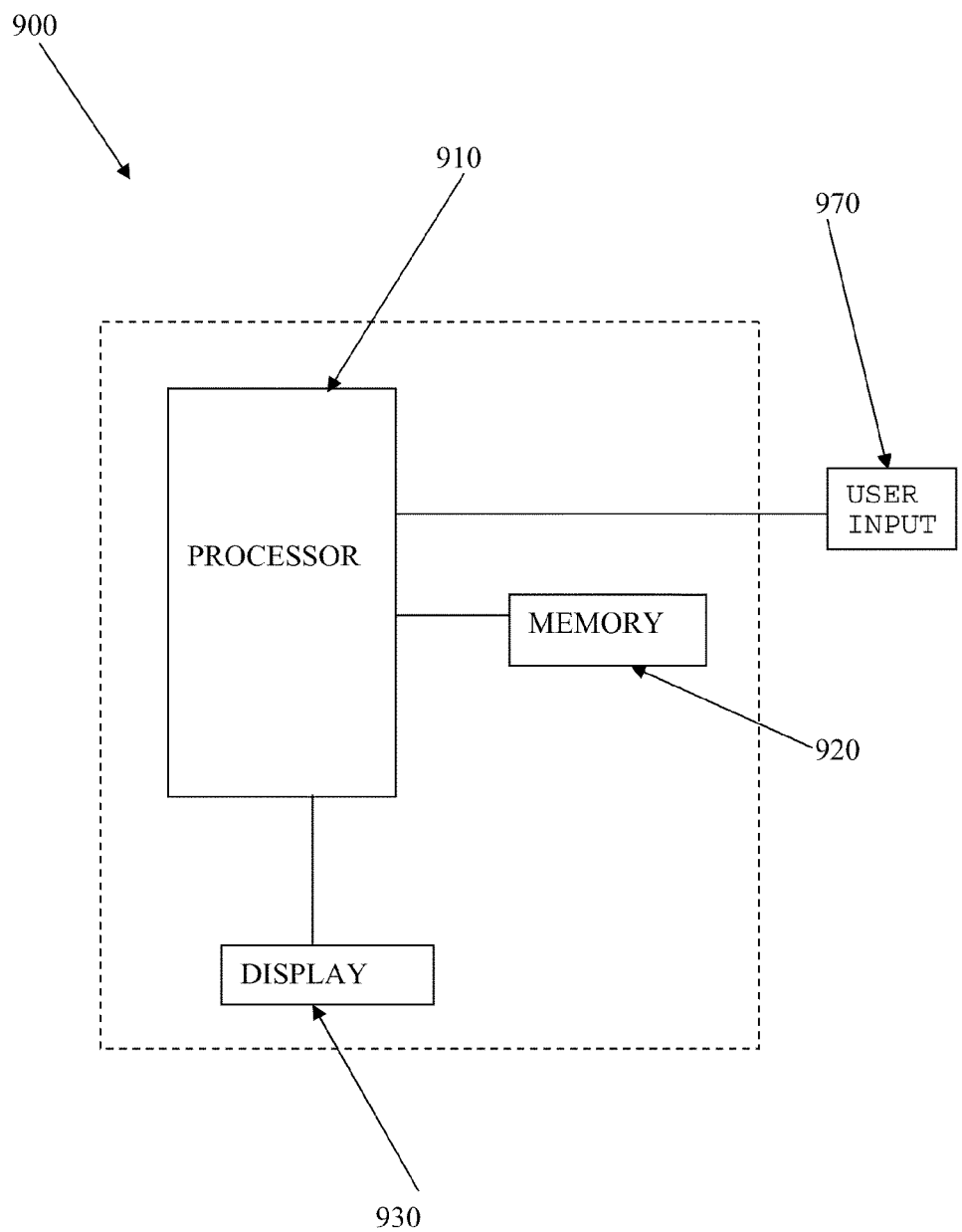
FIG. 9 shows a device in accordance with an embodiment of the present system.

FIG. 9 shows a device 900 in accordance with an embodiment of the present system. The device has a processor 910 operationally coupled to a memory 920, a display 930 and a user input device 970. The memory 920 may be any type of device for storing programming application data, such as simulation data as well as other data, such as attribute data, simulation event data, application attributes, etc. The programming application data and other data are received by the processor 910 for configuring the processor 910 to perform operation acts in accordance with the present system. The operation acts include controlling at least one of the display 930 to display content such as the GUIs 200, 300, 400, 500, 600, 700. The user input 970 may include a keyboard, mouse, trackball or other devices, including touch sensitive displays, which may be stand alone or be a part of a system, such as part of a personal computer, personal digital assistant, or other display device for communicating with the processor 910 via any type of link, such as a wired or wireless link. The user input device 970 is operable for interacting with the processor 910 including interaction within a paradigm of a GUI, selection and/or altering of network topology, parameters, application attributes and/or other elements of the present system. Clearly the processor 910, memory 920, display 930 and/or user input device 970 may all or partly be a portion of a computer system or other device.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 920 and/or other memory coupled to the processor 910.

The computer-readable medium and/or memory 920 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, or a wireless channel using time-division multiple access, code-division multiple access, or other radio-frequency channel). Any medium known or developed that may store and/or transmit information suitable for use with a computer system may be used as the computer-readable medium and/or memory 920.

Additional memories may also be used. The computer-readable medium, the memory 920, and/or any other memories may be long-term, short-term, or a combination of long-term and short-term memories. These memories configure processor 910 to implement the GUIs, methods, operational acts, and functions disclosed herein. The memories may be distributed or local and the processor 910, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory 920, for instance, because the processor 910 may retrieve the information from the network for operation in accordance with the present system.

The processor 910 is capable of providing control signals and/or performing operations in response to input signals from the user input device 970 and executing instructions stored in the memory 920. The processor 910 may be an application-specific and/or general-use integrated circuit(s). Further, the processor 910 may be a dedicated processor for performing in accordance with the present system and/or may be a general-purpose processor wherein only one of many functions operates for performing in accordance with the present system. The processor 910 may operate utilizing a program portion, multiple program segments, and/or may be a hardware device utilizing a dedicated or multi-purpose integrated circuit.

Of course, it is to be appreciated that any one of the above embodiments or processes may be combined with one or more other embodiments or processes or be separated in accordance with the present system. As should be clear, the present system enables a user to simulate an effect of network traffic, such as application related traffic, on a modeled network including effects on performance based on designated and alterable network attributes. While transactions are discussed in terms of application specific traffic, clearly the present system may also account for background transactions related to other network activity. For example, background transactions may be modeled as a separate application utilizing the network. The present system further provides a ready system for simulating network performance based on network and application specific attributes that may be manipulated within a graphical environment that simplifies the interaction with the present system. Further, the present system provides a simple workflow that may avoid configuration problems and simulation time associated with running a full discrete event simulation by modeling the network including topology based on a simplified performance model that may be modified and altered as desired.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method comprising:

analyzing, on an analysis machine, performance of a network when both a first and a second application are concurrently run on the network by:

setting current response times of the first and second applications to initial values, determining first current network conditions when the first application runs on the network with its current response times, determining new response times of the second application based on the first current network conditions, determining second current network conditions when the second application runs on the network with its current response times, determining new response times of the first application based on the second current network conditions, and repeating the determining of the new response times using the new response times as the current response times until a stable condition is reached; and providing one or more reports based on the performance of the network upon reaching the stable condition.

2. The method of claim 1, including:

defining a plurality of defined response times of the first application on the network based on a plurality of defined network conditions; and defining a plurality of defined response times of a second application on the network based on the plurality of defined network conditions;

wherein determining the new response times of the first and second applications is based on the defined response times.

3. The method of claim 2, wherein defining the plurality of defined response times of the first application includes defining at least one of the defined response times at boundary values of the defined network conditions.

4. The method of claim 3, wherein determining the new response times includes an interpolation between the defined response times at the boundary values.

5. The method of claim 4, wherein the boundary values include a minimum value and a maximum value of one or more conditions of the plurality of defined network conditions.

6. The method of claim 3, wherein the boundary values include a minimum value and a maximum value of one or more conditions of the plurality of defined network conditions.

7. The method of claim 3, wherein the plurality of defined network conditions includes two or more of: bandwidth, latency, packet loss, and TCP window size.

8. The method of claim 1, wherein the first and second current network conditions include at least one of: bandwidth, latency, packet loss, and TCP window size.

9. The method of claim 8, including determining at least one of the latency and the packet loss of the network based on the current response times.

10. The method of claim 1, wherein reaching the stable condition is determined based on a comparison of the current and new response times.

11. The method of claim 1, wherein determining the new response times includes determining a shortest path cost function attributed to each link of the network topology.

12. The method of claim 11, wherein the shortest path function is determined based on at least one of a link bandwidth and a latency.

13. The method of claim 1, wherein determining the new response time includes modeling one or more hops within the network as a network cloud having simplified interaction attributes.

14. The method of claim 1, wherein determining the new response time includes modeling each router in the network based solely on link buffer sizes.

15. The method of claim 1, wherein determining the new response time includes modeling each link having an attribute related to at least one of TCP window size, latency, bandwidth, packet loss, and utilization.

16. The method of claim 1, wherein determining the new response time includes modeling servers on the network by a utilization queuing model based on a number of simultaneous transactions on a server within a given time period.

17. The method of claim 1, wherein determining the new response time includes modeling congestion on a router in the network based on weighted fair queuing (WFQ) properties and the traffic flowing through the router.

18. The method of claim 1, wherein determining the new response time includes ignoring congestion effects on server delay.

19. A non-transitory computer readable medium upon which is stored a computer program that is configured to cause a processor to analyze performance of a network when both a first and a second application are concurrently run on the network by:

setting current response times of the first and second applications to initial values, determining first current network conditions when the first application runs on the network with its current response times, determining new response times of the second application based on the first current network conditions, determining second current network conditions when the second application runs on the network with its current response times, determining new response times of the first application based on the second current network conditions, repeating the determining of the new response times using the new response times as the current response times until a stable condition is reached, and providing one or more reports based on the performance of the network upon reaching the stable condition.

20. The medium of claim 19, wherein the program configures the processor to:

define a plurality of defined response times of the first application on the network based on a plurality of defined network conditions; and define a plurality of defined response times of a second application on the network based on the plurality of defined network conditions;

wherein determining the new response times of the first and second applications is based on the defined response times.

21. The medium of claim 20, wherein defining the plurality of defined response times of the first application includes defining at least one of the defined response times at boundary values of the defined network conditions.

22. The medium of claim 21, wherein determining the new response times includes an interpolation between the defined response times at the boundary values.

23. The medium of claim 22, wherein the boundary values include a minimum value and a maximum value of one or more conditions of the plurality of defined network conditions.

24. The medium of claim 21, wherein the boundary values include a minimum value and a maximum value of one or more conditions of the plurality of defined network conditions.

25. The medium of claim 21, wherein the plurality of defined network conditions includes two or more of: bandwidth, latency, packet loss, and TCP window size.

26. The medium of claim 19, wherein the first and second current network conditions includes at least one of: bandwidth, latency, packet loss, and TCP window size.

27. The medium of claim 26, including determining at least one of the latency and the packet loss of the network based on the current response times.

28. The medium of claim 19, wherein reaching the stable condition is determined based on a comparison of the current and new response times.

29. A system comprising:
a processor that is configured to analyze performance of a network when both a first and a second application are concurrently run on the network by:
  setting current response times of the first and second applications to initial values,
  determining first current network conditions when the first application runs on the network with its current response times,
  determining new response times of the second application based on the first current network conditions,
  determining second current network conditions when the second application runs on the network with its current response times,
  determining new response times of the first application based on the second current network conditions, and
  repeating the determining of the new response times using the new response times as the current response times until a stable condition is reached; and
a user interface that is configured to provide one or more reports based on the performance of the network upon reaching the stable condition.

30. The system of claim 29, wherein the processor is configured to:
  define a plurality of defined response times of the first application on the network based on a plurality of defined network conditions,
  define a plurality of defined response times of a second application on the network based on the plurality of defined network conditions, and
  determine the new response times of the first and second applications is based on the defined response times.

31. The system of claim 30, wherein the processor is configured to define the plurality of defined response times of the first application by defining one or more of the defined response times at boundary values of the defined network conditions.

32. The system of claim 31, wherein the processor is configured to determine the new response times via an interpolation between the defined response times at the boundary values.

33. The system of claim 32, wherein the boundary values include a minimum value and a maximum value of one or more conditions of the plurality of defined network conditions.

34. The system of claim 31, wherein the boundary values include a minimum value and a maximum value of one or more conditions of the plurality of defined network conditions.

35. The system of claim 31, wherein the plurality of defined network conditions includes two or more of: bandwidth, latency, packet loss, and TCP window size.

36. The system of claim 29, wherein the first and second current network conditions include at least one of: bandwidth, latency, packet loss, and TCP window size.

37. The system of claim 36, including determining at least one of the latency and the packet loss of the network based on the current response times.

38. The system of claim 29, wherein reaching the stable condition is determined based on a comparison of the current and new response times.

* * * * *